(12) United States Patent
Tomamoto et al.

(10) Patent No.: US 9,156,230 B2
(45) Date of Patent: Oct. 13, 2015

(54) GLASS FILM LAMINATE WITHOUT ADHESIVE

(75) Inventors: Masahiro Tomamoto, Otsu (JP); Takahide Fujii, Otsu (JP); Hiroshi Takimoto, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 193 days.

(21) Appl. No.: 13/004,233

(22) Filed: Jan. 11, 2011

(65) Prior Publication Data

US 2012/0080403 A1 Apr. 5, 2012

(30) Foreign Application Priority Data

Jan. 12, 2010 (JP) .................................. 2010-003611

(51) Int. Cl.
| | | |
|---|---|---|
| *B32B 7/00* | (2006.01) | |
| *B32B 7/06* | (2006.01) | |
| *C03C 27/00* | (2006.01) | |
| *C03C 17/00* | (2006.01) | |
| *B32B 17/06* | (2006.01) | |

(52) U.S. Cl.
CPC . *B32B 7/06* (2013.01); *B32B 17/06* (2013.01); *C03C 17/002* (2013.01); *C03C 27/00* (2013.01); *B32B 2457/202* (2013.01); *Y10T 428/24612* (2015.01); *Y10T 428/24926* (2015.01)

(58) Field of Classification Search
CPC ...................................................... B32B 7/045
See application file for complete search history.

(56) References Cited

U.S. PATENT DOCUMENTS

| | | | | |
|---|---|---|---|---|
| 4,925,725 A | * | 5/1990 | Endo et al. .................... | 428/156 |
| 5,683,786 A | * | 11/1997 | Kavanaugh ................ | 428/195.1 |
| 5,866,241 A | * | 2/1999 | Xiang ............................ | 428/210 |
| 5,869,150 A | | 2/1999 | Iwamoto | |
| 6,037,026 A | | 3/2000 | Iwamoto | |
| 6,194,055 B1 | * | 2/2001 | Eichhorn ....................... | 428/167 |
| 6,527,628 B2 | * | 3/2003 | Ito et al. ........................... | 451/57 |
| 6,863,956 B1 | * | 3/2005 | Nakajima et al. ............ | 428/156 |
| 2004/0238690 A1 | * | 12/2004 | Wood et al. ................ | 244/129.3 |
| 2008/0309867 A1 | * | 12/2008 | Kampstra ..................... | 428/426 |
| 2009/0247057 A1 | | 10/2009 | Kobayashi et al. | |

(Continued)

FOREIGN PATENT DOCUMENTS

| | | |
|---|---|---|
| EP | 2 450 324 | 6/2010 |
| EP | 2 479 151 | 7/2012 |

(Continued)

OTHER PUBLICATIONS

Sigma Aldrich, "Sigma Aldrich Catalogue 1994-1995". 1994, T419.*

(Continued)

*Primary Examiner* — David Sample
*Assistant Examiner* — Donald M Flores, Jr.
(74) *Attorney, Agent, or Firm* — Wenderoth, Lind & Ponack, L.L.P.

(57) ABSTRACT

A glass film laminate includes a supporting glass and a glass film peelably laminated to the supporting glass. A contacting surface of the glass film and a contacting surface of the supporting glass directly contact each other without an adhesive therebetween. The contacting surface of the supporting glass includes a first region and a second region with a surface roughness smaller than a surface roughness of the first region. An adhesive force between the supporting glass and the glass film is greater at the second region than at the first region.

18 Claims, 6 Drawing Sheets

(56) References Cited

U.S. PATENT DOCUMENTS

| | | | |
|---|---|---|---|
| 2009/0314032 A1 | 12/2009 | Tomamoto et al. | |
| 2011/0026236 A1 | 2/2011 | Kondo et al. | |
| 2011/0045229 A1 | 2/2011 | Takaya et al. | |
| 2011/0045239 A1* | 2/2011 | Takaya et al. | 428/428 |
| 2011/0123787 A1 | 5/2011 | Tomamoto et al. | |
| 2011/0261443 A1* | 10/2011 | Isojima et al. | 428/220 |

FOREIGN PATENT DOCUMENTS

| | | | |
|---|---|---|---|
| JP | 8-86993 | 4/1996 | |
| JP | 09-221342 | 8/1997 | |
| JP | 2000-241804 | 9/2000 | |
| JP | 2001-288424 | 10/2001 | |
| JP | 2005-209756 * | 8/2005 | H01L 21/336 |
| JP | 2005-255478 | 9/2005 | |
| JP | 2007-75949 | 3/2007 | |
| JP | 2008-133174 | 6/2008 | |
| JP | 2009-516863 | 4/2009 | |
| JP | 2009-184172 | 8/2009 | |
| JP | 2009-186916 | 8/2009 | |
| WO | 2007/032517 | 3/2007 | |
| WO | 2009/128359 | 10/2009 | |

OTHER PUBLICATIONS

G1: Microscope Slides—Glass, Quartz, Plastic, Coated, Cavity, Printed & Grid Indexed—<http://proscitech.com.au/cataloguex/online.asp?page=g1>.*

Thomas Scientific—Online Catalogue—"Diamond 198 White Glass Microscope Slides"—<http://www.thomassci.com/Supplies/Microscope-Slides/_/c1224a05-c3e6-4919-ae5b-cf5c9cca4b27>.*

The Royal College of Pathologists "Object 46 Glass slide"—<http://www.rcpath.org/the-college/50th-anniversary/50-objects/objects-41-50/object-46-glass-slide>.*

Debbie Knight "biologyze"—<http://biologyze.com/2013/01/28/a-day-in-the-life-january-28-2013/>.*

[NPL #6] IMEB Inc. International Medical Equipment, "Microscope Slides Fully-Frosted". IMEB Inc. (2012) <http://www.imebinc.com/microscope-slides-fully-frosted.html>.*

[NPL #7] Matsunami Glass Ind., Ltd. "Fine Frost glass slide". Matsunami Glass Ind., Ltd. (English page version Apr. 11, 2014) <http://www.matsunami-glass.co.jp/english/life/clinical_g/data08.html>.*

[NPL #8] Matsunami Glass Ind., Ltd. "Fine Frost glass slide". TheWayBackMachine (Japanese page version Jul. 10, 2011) <http://www.matsunami-glass.co.jp/english/life/clinical_g/data08.html>.*

[NPL #9] SPI Supplies "Glass Microscope Slides—Procedures to separate slides that tend to 'stick together' in the box". TheWayBackMachine (Aug. 23, 2003). <http://web.archive.org/web/20030823085324/http://www.2spi.com/catalog/magnifiers/separating-microscope-slides.html>.*

[NPL #10] C. Gui, M. Elwenspoed, N. Tas, J. G. E. Gardeniers "The effect of surface roughness on direct wafer bonding". J. Appl. Phys., vol. 85, No. 10, May 15, 1999 (p. 7448-7454).*

[NPL #11] K. Appenbrink "Adult Etch-a-Sketch: How to Etch Glass Bottles". TheWayBackMachine (Nov. 8, 2013). <http://www.brit.co/how-to-etch-glass/>.*

G1: Microscope Slides—Glass, Quartz, Plastic, Coated, Cavity, Printed & Grid Indexed—(2013)—<http://proscitech.com.au/cataloguex/online.asp?page=g1>.*

Thomas Scientific—Online Catalogue—"Diamond™ White Glass Microscope Slides" (Mar. 29, 2013)—<http://www.thomassci.com/Supplies/Microscope-Slides/_/c1224a05-c3e6-4919-ae5b-cf5c9cca4b27>.*

The Royal College of Pathologists "Object 46 Glass slide" (Jun. 2, 2013)—<http://www.rcpath.org/the-college/50th-anniversary/50-objects/objects-41-50/object-46-glass-slide>.*

International Preliminary Report on Patentability and Written Opinion of the International Searching Authority issued Aug. 16, 2012 in International (PCT) Application No. PCT/JP2011/050277.

International Search Report issued Mar. 1, 2011 in corresponding International (PCT) Application No. PCT/JP2011/050277.

Search Report issued May 2, 2014, in corresponding European Application No. 11732861.7.

Murakami et al., "Sticking of optical members and optical parts", XP-002711726, vol. 1997, Aug. 23, 1997, No. 46 (abstract).

* cited by examiner

GLASS FILM LAMINATE WITHOUT ADHESIVE

TECHNICAL FIELD

The present invention relates to a glass film laminate in which a glass film to be used for a glass substrate for an electronic device, such as a flat panel display typified by a liquid crystal display or an OLED display, a solar cell, a lithium ion battery, a digital signage, a touch panel, and an electronic paper, or a glass film to be used for a cover glass for an OLED lighting device, a package for a medicinal product, and the like is supported with a supporting glass, and to a glass film.

BACKGROUND ART

In recent years, from the viewpoint of space saving, there have been widely used flat panel displays such as a liquid crystal display, a plasma display, an OLED display, and a field emission display, in place of a CRT type display which is conventionally widely used. Further reduction in thickness is demanded for those flat panel displays. In particular, it is required that the OLED display be easily carried by being folded or wound and be usable not only on a flat surface but also on a curved surface. Further, uses on both flat surfaces and curved surfaces are not limited to only display devices. For example, if a solar cell or an OLED lighting device can be formed on a surface of an object having a curved surface, such as a surface of an automobile body, or a roof, a pillar, or an outer wall of a building, the applications thereof may expand. Substrates and cover glasses used for those devices are therefore required to be made thinner and to have high flexibility.

An illuminant used for an OLED display deteriorates in quality through contacting with gasses such as oxygen and water vapor. Thus, a substrate used for the OLED display is required to have high gas-barrier property, and hence the use of a glass substrate for the substrate is expected. However, glass used for a substrate is weak in tensile stress unlike a resin film, and hence is low in flexibility. Thus, application of a tensile stress on a surface of a glass substrate by bending the glass substrate leads to the breakage of the glass substrate. In order to impart flexibility to the glass substrate, the glass substrate is required to be made ultrathin. Thus, a glass film having a thickness of 200 μm or less is proposed as described in Patent Document 1 below.

A glass substrate used for electronic devices such as a flat panel display and a solar cell is subjected to various treatments associated with electronic device production, such as a treatment for providing a film such as a transparent conductive film and a washing treatment. However, when a glass film is used as a glass substrate for those electronic devices, the glass film breaks easily due to even a slight stress change, because glass is a brittle material. Thus, there is a problem in that the handling of the glass film is very difficult, when the above-mentioned various treatments associated with electronic device production are carried out. In addition, there is another problem in that a glass film having a thickness of 200 μm or less is rich in flexibility, and hence the positioning of the glass film is difficult when the treatments associated with production are carried out, and displacement or the like in patterning may occur.

Thus, in order to solve the above-mentioned problems, a laminate is proposed as described in Patent Document 2 below. Patent Document 2 below proposes a laminate in which a supporting glass substrate and a glass sheet are laminated via a pressure-sensitive adhesive layer that may be maintained almost stably even after its repeated use. According to such laminate, even if a glass sheet having less strength and rigidity by itself is used, the production of a liquid crystal display device may be carried out by sharing a conventional production line for a liquid crystal display device, and after completion of the production processes, the supporting glass substrate can be peeled. Further, thermal warpage or the like can be prevented from occurring to some extent because a glass substrate is used as a supporting member. In addition, such a problem in that the laminate is displaced when positioning and patterning during treatment associated with production is unlikely to be occurred, because the supporting member has a high rigidity.

CITATION LIST

Patent Document

Patent Document 1: JP 2008-133174 A
Patent Document 2: JP 08-86993 A

SUMMARY OF INVENTION

Technical Problem

However, there is a problem in that a pressure-sensitive adhesive substance remains on a glass film after a supporting glass substrate is peeled, causing contamination. In addition, there is a problem in that, when the glass film in a laminate is finally peeled from the supporting glass substrate to make the glass film separate, if the pressure-sensitive adhesive force of a pressure-sensitive adhesive layer on the supporting glass substrate is set to a strong level, the glass film cannot endure a tensile stress during peeling, and the glass film, which is a brittle material, is easy to break. On the other hand, if the pressure-sensitive adhesive force of the pressure-sensitive adhesive layer is set to a weak level, the adhesion between the supporting glass substrate and the glass film becomes insufficient. As a result, there is a possibility in that the displacement between the supporting glass substrate and the glass film may take place in treatment associated with production, causing a positioning error, displacement in patterning, or the like.

A first object of the present invention is to enable easy peeling of a glass film from a supporting member at the time when the glass film is incorporated into any of various kinds of devices after treatment associated with production, while enabling the supporting member to firmly support the glass film during the treatment associated with production.

A second object of the present invention is to provide a glass film laminate that is capable of reliably preventing a pressure-sensitive adhesive from remaining on a glass film after the peeling of the glass film from a supporting member.

Solution to Problem

The present invention provides a glass film laminate, comprising a glass film and a supporting member which are laminated to each other, wherein an adhering portion (laminated portion) between a contacting surface of the glass film and a contacting surface of the supporting member comprises a region with a relatively strong adhesive force and a region with a relatively weak adhesive force, in other words, regions being different in adhesive force from each other. Here, the supporting member to be used in the present invention includes one formed of an inorganic material such as glass or ceramics, one formed of a resin or metal material. Further, the region with a relatively weak adhesive force may be a region with no adhesive force. Besides, the glass film laminate of the present invention includes one obtained by adhering the contacting surface of the glass film and the contacting surface of the supporting member by directly contacting both the surfaces with each other and one obtained by adhering the contacting surface of the glass film and the contacting surface of the supporting member via a pressure-sensitive adhesive layer (adhesive layer). In the former, the supporting member may be formed of glass (supporting glass) and at least one of the contacting surfaces of the glass film and the supporting glass may be provided with a region with a relatively large surface roughness and a region with a relatively small surface roughness, in other words, regions being different in surface roughness from each other. In the latter, the pressure-sensitive adhesive layer (adhesive layer) may have a layer region with a relatively strong adhesive force and a layer region with a relatively weak adhesive force, in other words, layer regions being different in adhesive force from each other, or a partial region of the adhering portion may have no pressure-sensitive adhesive layer (adhesive layer).

In the present invention, it is preferred that the supporting member be formed of glass (supporting glass) and at least one of the contacting surfaces of the glass film and the supporting glass comprises a region with a relatively large surface roughness and a region with a relatively small surface roughness.

For example, the contacting surface of the supporting glass may comprise the region with a relatively large surface roughness and the region with a relatively small surface roughness.

The region with a relatively small surface roughness preferably has a surface roughness Ra of 2.0 nm or less.

In addition, a difference in surface roughness Ra between the region with a relatively large surface roughness and the region with a relatively small surface roughness is preferably 0.1 nm or more.

In the present invention, the contacting surface may comprise the region with a relatively small surface roughness at an outer peripheral portion thereof and the region with a relatively large surface roughness at an inner portion surrounded by the outer peripheral portion.

Alternatively, the contacting surface may comprise the region with a relatively small surface roughness at a corner thereof.

Alternatively, the contacting surfaces may comprise the region with a relatively large surface roughness at an outer peripheral portion thereof and the region with a relatively small surface roughness at an inner portion surrounded by the outer peripheral portion.

Alternatively, the regions with a relatively large surface roughness and the regions with a relatively small surface roughness are formed alternately on the contacting surface in a stripe configuration.

Further, the glass film and the supporting glass are laminated so that at least a part of edge portion of the glass film laminate may comprise a step.

The present invention also provides a method of producing a glass film laminate comprising a glass film and a supporting glass laminated to each other, the method comprising the steps of roughening a partial region of the at least one of a contacting surface of the glass film and a contacting surface of the supporting glass, and laminating the glass film and the supporting glass in a state in which the contacting surfaces are brought into contact with each other.

In the above method, the glass film and the supporting glass are preferably formed by an overflow down-draw method.

Further, the roughening may include one kind or two or more kinds of treatment selected from etching treatment with hydrofluoric acid, etching treatment with an atmospheric-pressure plasma, roughening treatment by formation of a thin film, and roughening treatment by sandblasting.

The present invention also provides a method of producing a glass film, comprising a first step of forming a region with a relatively large surface roughness and a region with a relatively small surface roughness on at least one of a contacting surface of a supporting glass and a contacting surface of a glass film, a second step of forming a glass film laminate by adhering the contacting surface of the supporting glass and the contacting surface of the glass film to each other, a third step of subjecting the glass film laminate to treatment associated with production, and a fourth step of peeling the glass film from the supporting glass after the treatment associated with production.

Advantageous Effects of Invention

According to the present invention, the adhering portion between the contacting surface of the glass film and the contacting surface of the supporting member comprises the region with a relatively strong adhesive force and the region with a relatively weak adhesive force, and hence treatment associated with production can be stably carried out in the state in which the glass film is firmly laminated on the supporting member due to the region with a relatively strong adhesive force. In addition, the adhering portion comprises the region with a relatively weak adhesive force, and hence it is possible to easily peel the glass film from the region with a relatively weak adhesive force after the treatment associated with production. Thus, it is possible to prevent an improper peeling and removal of a glass film during treatment associated with production in a case of an adhesive force of an adhering portion being overall too week, while preventing the breakage of a glass film at the time of peeling in a case of an adhesive force of an adhering portion being overall too strong.

When the supporting member is formed of glass (supporting glass) and at least one of the contacting surface of the glass film and the contacting surface of the supporting glass comprises the region with a relatively large surface roughness and the region with a relatively small surface roughness, the glass film and the supporting glass becomes adhered weakly in the region with a relatively large surface roughness (hereinafter, referred to as rough surface), and the glass film and the supporting glass becomes adhered strongly in the region with a relatively small surface roughness (hereinafter, referred to as smooth surface). It is considered that, when smooth surfaces are brought into contact with each other, the distance between both the surfaces becomes small to such an extent as hydroxyl groups existing on both the surfaces can form hydrogen adhering. Thus, it is considered that both the surfaces are adhered with good adhesiveness and the contacting surface of the glass film and the contacting surface of the supporting glass can be adhered strongly and stably even if no adhesive is used. As a result, treatment associated with production can be stably carried out in the state in which the glass film is firmly laminated on the supporting glass, and the glass film can be easily peeled from the rough surface after the treatment associated with production as well. Besides, as no adhesive is used, the glass film has no remaining adhesive after the glass film is peeled from the supporting glass.

The supporting glass can be reused. When the contacting surface of the supporting glass comprises the region with a relatively large surface roughness and the region with a relatively small surface roughness, carrying out roughening treatment once on a partial region of the contacting surface of the supporting glass, for example, enables to reuse the supporting glass without any additional roughening treatment, leading to simplification of the production process. On the other hand, roughening treatment on the glass film may not be preferred in some cases even if the roughening treatment is carried out on its back surface side because the glass film is used as a glass substrate for devices.

When the region with a relatively small surface roughness has a surface roughness Ra of 2.0 nm or less, the glass film and the supporting glass can be adhered more firmly.

When the difference in surface roughness Ra between the region with a relatively large surface roughness and the region with a relatively small surface roughness is 0.1 nm or more, the glass film and the supporting glass can be adhered properly, good positioning can be made in treatment associated with production, and the glass film can be easily peeled from the supporting glass after the treatment associated with production. Consequently, it becomes possible to strike a balance between adhesive property and peeling property.

When the contacting surface comprises the region with a relatively large surface roughness at an outer peripheral portion thereof and the region with a relatively small surface roughness at an inner portion surrounded by the outer peripheral, the glass film and the supporting glass can be firmly adhered with a small adhesive area along the outer peripheral portion of the contacting surface. Besides, even if treatment associated with production includes a process in which a solvent is used, it is possible to prevent the solvent from entering a gap between the glass film and the supporting glass.

When the contacting surfaces comprises the region with a relatively small surface roughness at a corner thereof, the glass film can be firmly adhered with the supporting glass at the corner, and the glass film can be laminated on the supporting glass with a smaller adhesive area.

When the contacting surfaces comprises the region with a relatively large surface roughness at an outer peripheral portion thereof and the region with a relatively small surface roughness at an inner portion surrounded by the outer peripheral portion, when peeling the glass film from the supporting glass, it is possible to start peeling the glass film easily from the outer peripheral portion.

When the regions with a relatively large surface roughness and the regions with a relatively small surface roughness are formed alternately on the contacting surface in a stripe configuration, the glass film can be peeled from the supporting glass stably with a constant force by peeling the glass film in the longitudinal direction of the stripe configuration.

When the glass film and the supporting glass are laminated so that at least a part of edge portion of the glass film laminate comprised a step, in the case where the glass film projects from the supporting glass, it becomes possible to peel the glass film from the supporting glass more easily and reliably. On the other hand, in the case where the supporting glass projects from the glass film, it is possible to properly protect an end portion of the glass film from striking and sticking or the like.

Further, the method of producing a glass film laminate according to the present invention comprises the step of roughening a partial region of the at least one of the contacting surface of the glass film and the contacting surface of the supporting glass, and the step of laminating the glass film and the supporting glass in the state in which the contacting surfaces are brought into contact with each other, and hence the above-mentioned glass film laminate can be easily produced.

When the glass film and the supporting glass are formed by an overflow down-draw method, both have surfaces with a small surface roughness and high smoothness, and hence the above-mentioned glass film laminate can be produced more easily by roughening a partial region of the surface.

When the roughening comprises one kind or two or more kinds of treatment selected from etching treatment with hydrofluoric acid, etching treatment with an atmospheric-pressure plasma, roughening treatment by formation of a thin film, and roughening treatment by sandblasting, it is possible to easily form a contacting surface comprising a roughened region and a non-roughened region by appropriately using a masking tape or the like.

Further, the method of producing a glass film according to the present invention comprises the first step of forming a region with a relatively large surface roughness and a region with a relatively small surface roughness on at least one of the contacting surface of a supporting glass and the contacting surface of a glass film, the second step of forming a glass film laminate by adhering the contacting surface of the supporting glass and the contacting surface of the glass film, the third step of subjecting the glass film laminate to treatment associated with production, and the fourth step of peeling the glass film from the supporting glass after the treatment associated with production, and hence it is possible to easily produce glass films to which treatment associated with production is applied for various applications.

DESCRIPTION OF EMBODIMENTS

Hereinafter, preferred embodiments of a glass film laminate according to the present invention are described with reference to the drawings.

Figure 1A:
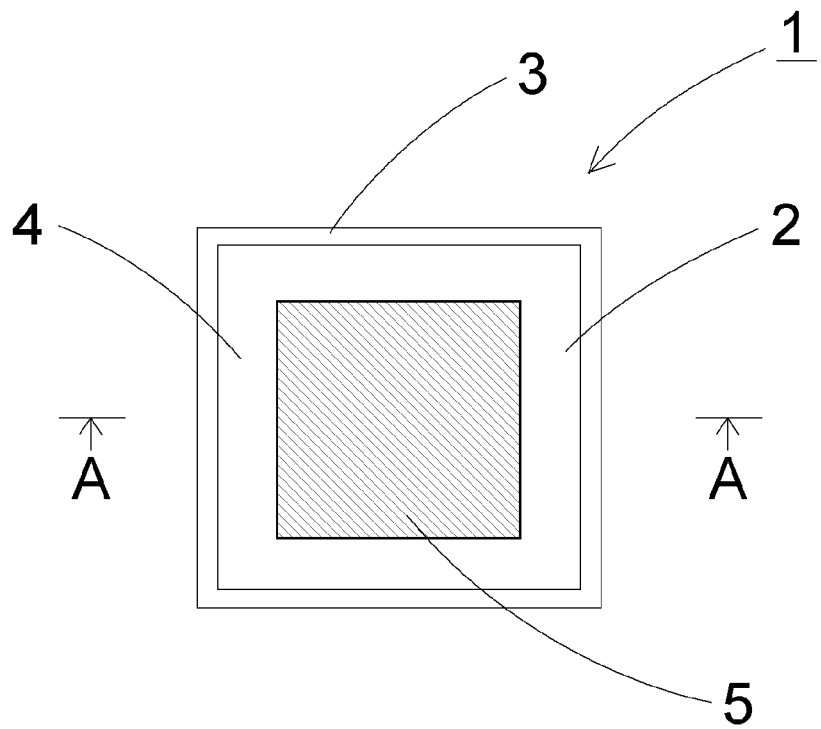
FIG. 1(a) is a plan view of a glass film laminate according to the present invention.
Figure 1B:
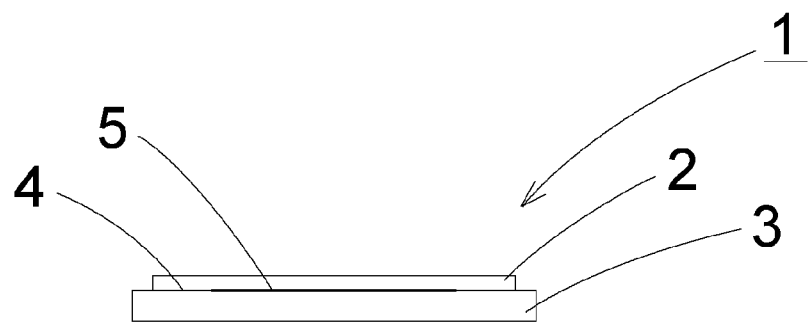
FIG. 1(b) is a cross-sectional view taken along the line A-A in FIG. 1(a).

As shown in FIG. 1, a glass film laminate (1) according to the present invention comprised a glass film (2) and a supporting glass (3). The contacting surface of the supporting glass (3) includes a smooth surface (4) (i.e. a second region) with a relatively small surface roughness and a rough surface (5) (i.e. a first region) with a relatively large surface roughness, and the glass film (2) and the supporting glass (3) are laminated to each other without using an adhesive or the like.

For the glass film (2), silicate glass is used, or silica glass or borosilicate glass is preferably used, or alkali-free glass is most preferably used. If the glass film (2) contains an alkali component, cation removal occurs on a surface of the glass film, leading to occurrence of a so-called too-abundant soda phenomenon and resulting in a coarse structure. In this case, if the glass film (2) is continuously used in a bent state, the glass film (2) may break at a coarse portion which is caused due to aging degradation. Note that the alkali-free glass is glass substantially free of alkali components (alkali metal oxides), and specifically, glass that contains the alkali metal oxides at a weight ratio of 1000 ppm or less. The content of the alkali metal oxides in the present invention is preferably 500 ppm or less, more preferably 300 ppm or less.

The glass film (2) has a thickness of preferably 300 μm or less, more preferably 5 μm to 200 μm, most preferably 5 μm to 100 μm. With this, a thickness of the glass film (2) may be made thinner to impart an appropriate flexibility to the glass film (2). Moreover, when the glass film (2) has a smaller thickness, handling the glass film (2) may become difficult and there may be problems such as a positioning error and displacement in patterning. However, by using the supporting glass (3) in the present invention, treatment associated with production can be easily carried out. Meanwhile, when the glass film (2) has a thickness of less than 5 μm, the glass film (2) tends to have insufficient strength. As a result, when the glass film (2) is peeled from the glass film laminate (1) to be incorporated into a device, the glass film (2) becomes liable to cause a breakage. On the other hand, when the glass film (2) has a thickness exceeding 300 μm, it may become difficult to impart flexibility to the glass film (2).

For the supporting glass (3), similar to the glass film (2), silicate glass, silica glass, borosilicate glass, alkali-free glass, or the like is used. The supporting glass (3) is preferably made of glass having a difference in thermal expansion coefficient within $5 \times 10^{-7}/°C.$ over 30 to 380° C. with respect to the glass film (2). With this, there can be provided the glass film laminate (1) in which thermal warpage or the like due to difference in thermal expansion coefficients is hardly caused even if a heat treatment is carried out during treatments associated with production, and a stable laminated state can be maintained.

The supporting glass (3) preferably has a thickness of 400 μm or more. This is because if the supporting glass (3) has a thickness of less than 400 μm, the supporting glass (3) may have a problem in strength when handling it separately. The supporting glass (3) preferably has a thickness of 400 μm to 700 μm, most preferably 500 μm to 700 μm. With this, the glass film (2) can be securely supported.

Figure 2:
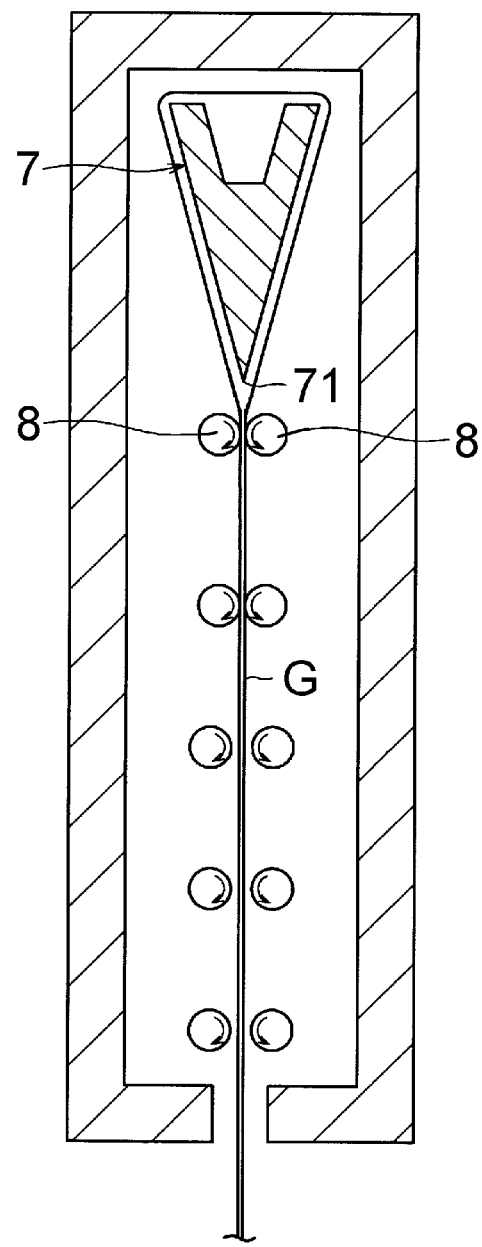
FIG. 2 is an explanatory diagram of an apparatus for producing a glass film and a supporting glass.

The glass film (2) and the supporting glass (3) to be used in the present invention are preferably formed by a down-draw method. This is because the glass film (2) can be formed so as to have a smoother surface. In particular, the overflow down-draw method shown in FIG. 2 is a forming method in which both surfaces of a glass sheet are not brought into contact with a forming member during a forming process, and hence flaws are hardly causes on the both surfaces (translucent surfaces) of the obtained glass sheet, and high smoothness may be obtained for the glass sheet without polishing work. With this, it is possible to bond the glass film (2) and the supporting glass (3) more firmly at the smooth surface (4).

A glass ribbon (G) immediately after being flown down from a lower end portion (71) of a forming body (7) having a wedge shape in its cross-section is drawn downwardly while shrinkage thereof in a width direction being restricted by cooling rollers (8), resulting in a thin ribbon having a predetermined thickness. Subsequently, the glass ribbon (G) having the predetermined thickness is annealed in an annealer to remove heat strain in the glass ribbon (G), followed by cutting of the glass ribbon (G) into pieces having a predetermined size. As a result, the glass film (2) and the supporting glass (3) are formed.

As shown in FIG. 1, the contacting surface of the supporting glass (3) includes, the smooth surface (4) and the rough surface (5). When the glass film (2) is adhered to the contacting surface of the supporting glass (3), the glass film (2) and the supporting glass (3) are adhered firmly at the smooth surface (4) due to good adhesiveness thereof, while the glass film (2) and the supporting glass (3) are adhered weakly at the rough surface (5). With this, treatment associated with production can be carried out in the state in which the glass film (2) is firmly laminated on the supporting glass (3), and the glass film (2) can be easily peeled from the rough surface (5) after the treatment associated with production. Note that in the plan views of FIG. 1, FIG. 3, and FIG. 4, each rough surface (5) in the contacting surface of each supporting glass (3) is represented by diagonal lines, and that in the cross-sectional views of FIG. 1, FIG. 4, and FIG. 5, each rough surface (5) is represented by a bold line.

The smooth surface (4) in the contacting surface of the supporting glass (3) preferably has a surface roughness Ra of 2.0 nm or less. When the smooth surface (4) has a surface roughness Ra of 2.0 nm or less, an adhesive area per unit area between the glass film (2) and the supporting glass (3) increases, thereby improving their adhesiveness. As a result, the glass film (2) and the supporting glass (3) can be firmly adhered. The contacting surface of the glass film (2) also preferably has a surface roughness Ra of 2.0 nm or less. The contacting surface of the glass film (2) and the smooth surface (4) in the contacting surface of the supporting glass (3) each have a surface roughness Ra of more preferably 1.0 nm or less, still more preferably 0.5 nm or less, most preferably 0.2 nm or less.

A difference in the surface roughness Ra between the smooth surface (4) and the rough surface (5) in the contacting surface of the supporting glass (3) is preferably 0.1 nm or more, more preferably 0.3 nm or more. With this, the supporting glass (3) and the glass film (2) can be properly adhered at the smooth surface (4), and the glass film (2) can be easily peeled from the supporting glass (3). On the other hand, if the difference in the surface roughness Ra is less than 0.1 nm, the effect of making a difference in the surface roughness is difficult to be exerted. Further, the difference in the surface roughness Ra between the smooth surface (4) and the rough surface (5) in the contacting surface of the supporting glass (3) is not particularly limited from the view points of adhesive property and peeling property, and is preferably 2000 nm or less from the viewpoint of saving labor in forming rough surfaces.

The ratio in area of the smooth surface (4) to the rough surface (5) in the contacting surface of the supporting glass (3) is preferably 1:1000 to 5:1. In order to strike a balance between the adhesive property and the peeling property, the ratio is more preferably 1:500 to 4:1, most preferably 1:200 to 3:1. Note that, in a case where a smooth surface (4) and a rough surface (5) are provided on the contacting surface of the glass film (2), the same ratio as described above is also preferred.

As shown in FIG. 1, it is possible to adopt a configuration in which the smooth surface (4) is provided along the outer peripheral portion of the supporting glass (3), and the rough surface (5) with a relatively large surface roughness Ra is provided in the inner portion surrounded by the smooth surface (4). With this, it is possible to firmly adhere the glass film (2) and the supporting glass (3) with a small adhesive area along the outer peripheral portion of the glass film laminate (1). Even if treatment associated with production includes a process in which a liquid is used, it is possible to prevent the liquid from entering a gap between the glass film (2) and the supporting glass (3), and hence it is possible to prevent the glass film (2) from easily being peeled from the supporting glass (3).

Figure 3:
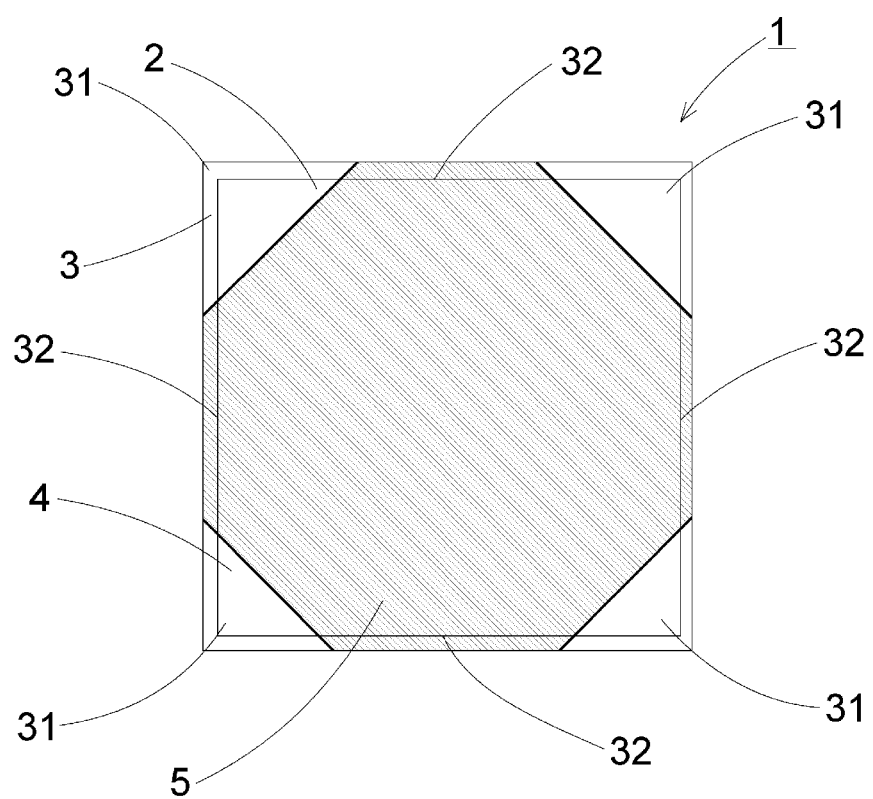
FIG. 3 is a view of a glass film laminate having smooth surfaces at its corners.

As shown in FIG. 3, it may also be possible to adopt a configuration in which the contacting surface of the supporting glass (3) includes the smooth surfaces (4) at its corners (31). With this, the contacting surface of the glass film (2) can be firmly adhered at its corners to the supporting glass (3), and hence the glass film (2) and the supporting glass (3) can be laminated with a small adhesive area.

Figure 4A:
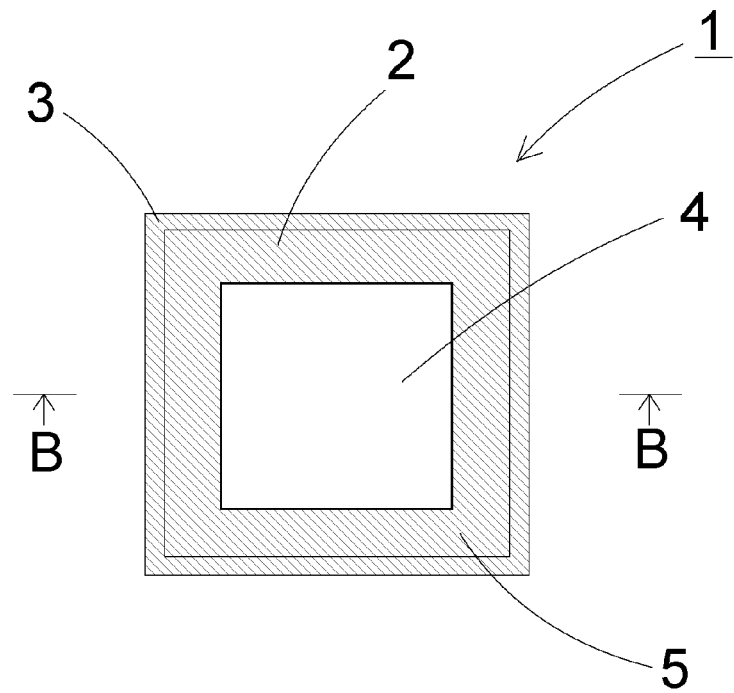
FIG. 4(a) is a plan view of a glass film laminate having a smooth surface at its central part.
Figure 4B:
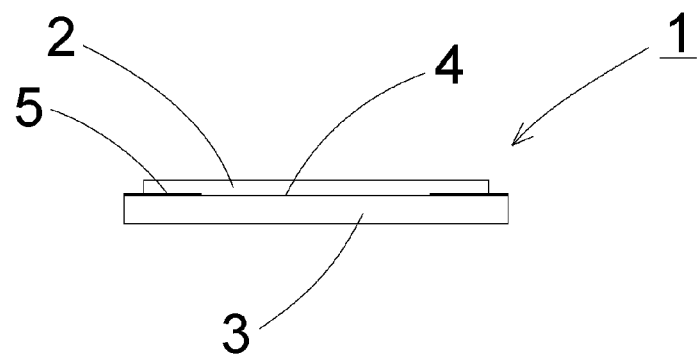
FIG. 4(b) is a cross-sectional view taken along the line B-B in FIG. 4(a).

As shown in FIG. 4, it may also be possible to adopt a configuration in which the supporting glass (3) includes the rough surface (5) at its outer peripheral portion and the smooth surface (4) is provided in the inner portion surrounded by the rough surface (5). With this, when the glass film (2) is peeled from the supporting glass (3), the peeing can be easily started. As only the central part of the glass film (2) is brought into contact, the glass film (2) does not adhere in a deflected state to the supporting glass (3). With this, irregularities, which are disadvantageous in treatment associated with production, can be reliably prevented from occurring. Note that, when treatment associated with production includes a process in which a solvent is used, a masking tape may be attached on the sides of the glass film laminate (1).

Figure 5A:
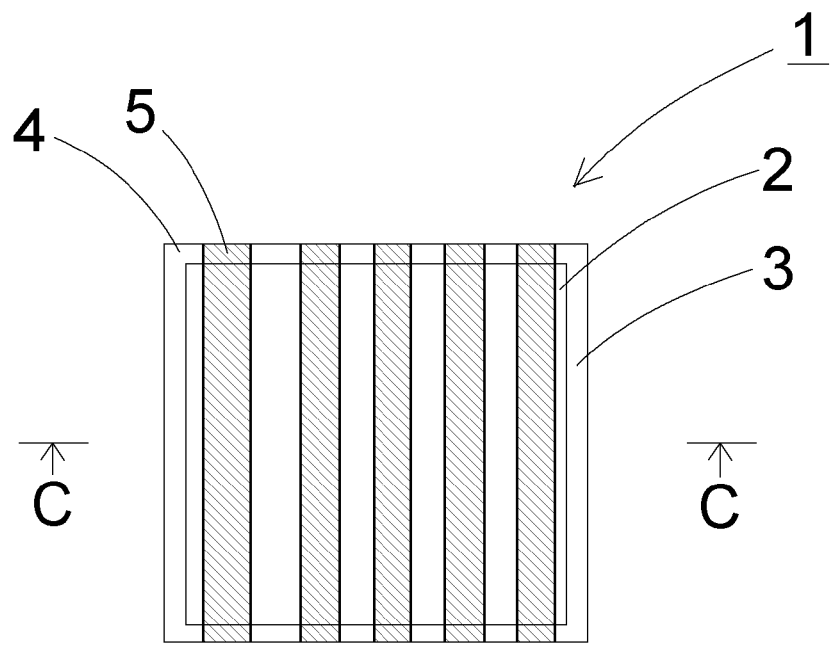
FIG. 5(a) is a plan view of a glass film laminate in which rough surfaces and smooth surfaces are provided alternately in a stripe configuration on a surface of a supporting glass.
Figure 5B:
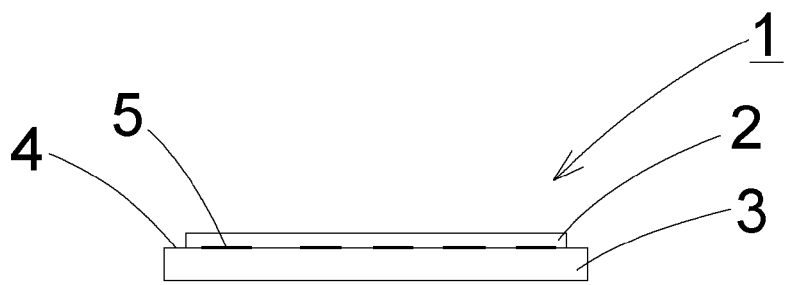
FIG. 5(b) is a cross-sectional view taken along the line B-B in FIG. 5(a).

As shown in FIG. 5, it is possible to adopt a configuration in which the contacting surface of the supporting glass (3) includes stripe rough surfaces (5) and stripe smooth surfaces (4) alternately. The glass film (2) can be peeled from the supporting glass (3) stably with a constant force by peeling the glass film (2) in the longitudinal direction (the vertical direction in FIG. 5(a)) of the rough surfaces (5) and smooth surfaces (4), because the adhesive force between the supporting glass (3) and the glass film (2) is constant.

The following method can be exemplified as means for providing a region with a relatively large surface roughness and a region with a relatively small surface roughness in the contacting surface of the supporting glass (3).

Part of the contacting surface of a supporting glass (3) having an excellent surface quality is protected with a masking tape or the like, and then, roughening treatment is carried out by using physical means or chemical means, followed by removal of the masking tape. The result is formation of a contacting surface including a smooth surface (4) which has been protected with the masking tape or the like and a rough surface (5) which has been formed by the roughening.

There are exemplified, as physical roughening means, a method in which part of the contacting surface of a supporting glass (3) is protected with a masking tape or the like, and then, an exposed surface is roughened by sandblasting and a method in which a rough surface is formed by formation of a thin film. In particular, when a supporting glass (3) has a good surface precision, there may be used a method in which part of the contacting surface of the supporting glass (3) is protected with a masking tape or the like, and then, an exposed surface is polished by using alumina or cerium oxide. Further, there are exemplified, as chemical roughening means, etching with hydrofluoric acid and a method using an atmospheric-pressure plasma.

FIG. 6 each shows a glass film laminate (1) in which a glass film (2) and a supporting glass (3) are laminated so that an edge portion of the glass film laminate (1) includes a step (6).

Figure 6A:
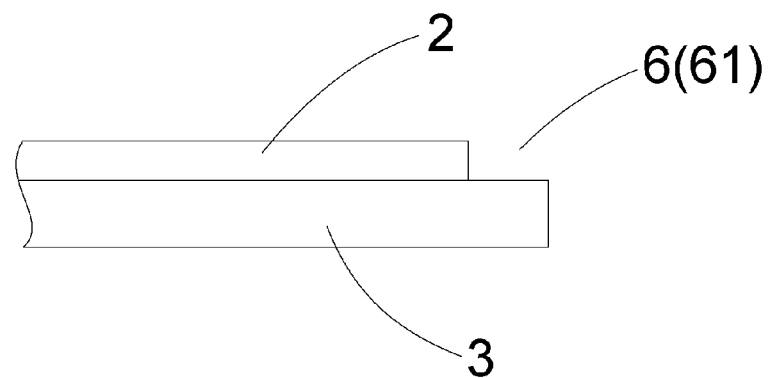
FIG. 6(a) is a side view of a glass film laminate in which a glass film and a supporting glass are laminated so that an edge portion of the glass film laminate comprises a step, the glass film laminate having a configuration in which the supporting glass projects from the glass film.

In FIG. 6(a), a step (61) is formed so that the supporting glass (3) projects from the glass film (2). With this, the end portion of the glass film (2) can be protected more properly. Note that, in the configuration shown in FIG. 6(a), as described with reference to FIG. 4, it is preferred that the peripheral portion of the glass film (2) comprise a rough surface (5). When the peripheral portion comprises the rough surface (5), the glass film (2) can be easily peeled from the supporting glass (3) by inserting a member having a thin-plate shape (such as a resin sheet) between the glass film (2) and the supporting glass (3).

Figure 6B:
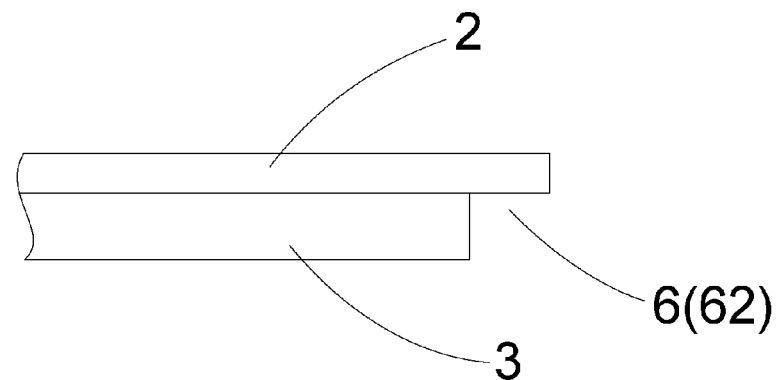
FIG. 6(b) is a view of a glass film laminate in which a glass film and a supporting glass are laminated so that an edge portion of the glass film laminate comprised a step, the glass film laminate having a configuration in which the glass film projects from the supporting glass.

On the other hand, in FIG. 6(b), a step (62) is formed in a state in which the glass film (2) projects from the supporting glass (3). With this, when peeling of the glass film (2) and the supporting glass (3) is started, only the glass film (2) can easily be grasped, and hence peeling of the both can be performed more easily and surely. The step (62) may only be formed at least a part of the peripheral portion of the glass film laminate (1). For example, when the glass film laminate (1) has a rectangular shape in a planar view, a step may only be formed at least one side of the four sides. Further, a notch (orientation flat) may be formed at a part of one of the four corners of the supporting glass (3), to thereby form a step. Note that, in the configuration shown in FIG. 6(b), as described with reference to FIG. 1, it is preferred that the peripheral portion of the glass film (2) comprise a smooth surface (4). When the peripheral portion comprised the smooth surface (4), in a case where a solvent is used in treatment associated with production, it is possible to prevent the solvent from entering a gap between the glass film (2) and the supporting glass (3).

The projected length of the glass film (3) is preferably 0.1 mm to 20 mm. If the projected length is less than 0.1 mm, it may be hard to grasp the edge portion of the glass film (2) at the time of the start of peeling, and if the projected length exceeds 20 mm, a breakage of the glass film (2) may occur when an external force such as striking is applied to the side edge portion of the glass film laminate (1).

In addition, the glass film laminate (1) is constructed so as to comprise, at the end portion of the glass film laminate (1), both steps including a step formed by projecting the edge portion of the supporting glass (3) from the edge portion of the glass film (2) and a step (4) formed by projecting the edge portion of the glass film (2) from the edge portion of the supporting glass (3). As a result, each of the glass film (2) and the supporting glass (3) can be grasped at the same time, and further the glass film (2) can be peeled easily. The respective steps are most preferably formed adjacently to each other.

A surface of the glass film (2) of the glass film laminate (1) according to the present invention is subjected to various kinds of treatment associated with electronic device production, such as film formation, firing, washing, and patterning. After the treatment associated with production, the glass film (2) is peeled from the supporting glass (3) of the glass film laminate (1). The glass film (2) is peeled by inserting a sheet between the glass film (2) and the supporting glass (3). The sheet preferably has higher strength and higher surface smoothness. A Teflon (registered trademark) sheet is preferably used. It is preferred that the sheet be inserted lightly. If the sheet is inserted deeply, the contacting area between the sheet and the glass becomes larger, resulting in their increased frictional force. As a result, the glass film (2) may break when it is peeled. After being peeled, the glass film (2) is used for each intended application. For example, the glass film (2) is appropriately used as a glass substrate for an electronic device or the like. After the glass film (2) is peeled, the resultant supporting glass (3) can be reused.

As described above, in the above-mentioned embodiment, the region with a relatively large surface roughness and the region with a relatively small surface roughness were provided on the contacting surface of the supporting glass (3). However, the present invention is not limited to the above-mentioned embodiment, and a region with a relatively large surface roughness and a region with a relatively small surface roughness may be provided on the contacting surface of the glass film (2). Alternatively, a region with a relatively large surface roughness and a region with a relatively small surface roughness may be provided on each of the contacting surface of the supporting glass (3) and the contacting surface of the glass film (2).

EXAMPLES

Example 1

Hereinafter, the glass film laminate of the present invention is described in detail based on examples, but the present invention is not limited to those examples.

Example

A transparent glass sheet having a rectangular shape measuring 300 mm in length, 300 mm in width, and 500 μm in thickness was used as a supporting glass. A right triangular notch (orientation flat) measuring 3 mm in length and 3 mm in width was provided at a corner of the supporting glass. A glass film measuring 298 mm in length, 298 mm in width, and 100 μm in thickness was used as a glass film to be laminated on the contacting surface of the supporting glass. Alkali-free glass manufactured by Nippon Electric Glass Co., Ltd. (Product name: OA-10G, thermal expansion coefficient over 30 to 380° C.: $38 \times 10^{-7}$/° C.) was used for the supporting glass and the glass film. The supporting glass and the glass film were formed by an overflow down-draw method. The four corners of the contacting surface of the supporting glass were protected with masking tapes, and a 1% hydrofluoric acid solution was applied to the contacting surface of the supporting glass to carry out roughening treatment. 30 seconds after the application of the hydrofluoric acid solution, washing treatment was carried out, followed by removal of the masking tapes. Thus, the surfaces that had been protected with the masking tapes served as smooth surfaces and the surface that had been treated with hydrofluoric acid served as a rough surface. The surface roughness Ra of each of the smooth surface and the rough surface in the contacting surface of the supporting glass was measured by using an AFM (Nanoscope III a) manufactured by Veeco Instruments under the conditions of a scan size of 10 μm, a scan rate of 1 Hz, and 512 sample lines. The surface roughness Ra was determined based on a value obtained by measurement for a range of 10 μm square. The rough surface of the supporting glass had a surface roughness Ra of 0.5 nm and the smooth surface of the supporting glass had a surface roughness Ra of 0.2 nm. The glass film had a surface roughness Ra of 0.2 nm.

After that, the glass film was laminated on the contacting surface of the supporting glass, producing a glass film laminate of Example. A surface of the glass film of the resultant glass film laminate was subjected to washing treatment and film-forming treatment. The supporting glass and the glass film were adhered satisfactorily, and hence positioning and handling in the treatment were performed without any problem. A Teflon (registered trademark) sheet was inserted from a step (see FIG. 5(b)) formed in the notch (orientation flat) portion provided at the corner of the supporting glass. The region in which the Teflon sheet was inserted was gradually broadened, thereby peeling the glass film from the supporting glass. As a result, the glass film was peeled from the rough surface satisfactorily and did not break.

Comparative Example 1

A glass film laminate of Comparative Example 1 was obtained by performing the same method as that in the above-mentioned example, except that the roughening treatment was not carried out on the contacting surface of the supporting glass. Note that the contacting surface of each of both the supporting glass and the glass film had a surface roughness Ra of 0.2 nm.

A surface of the glass film of the resultant glass film laminate of Comparative Example 1 was subjected to film-forming treatment and washing treatment. The supporting glass and the glass film were adhered satisfactorily, and hence positioning and handling in the treatment were performed without any problem. However, when a Teflon (registered trademark) sheet was inserted up to approximately the central part of the glass film laminate after the treatment, the Teflon (registered trademark) sheet was deflected, the glass film largely bent because of too strong an adhesive force, and in some cases, the glass film broke during peeling.

Comparative Example 2

The contacting surface of a supporting glass was subjected to polishing treatment with alumina and cerium oxide so that the contacting surface has uniformly a surface roughness Ra of 2.2 nm. After that, a glass film was laminated on the contacting surface of the supporting glass, producing a glass film laminate of Comparative Example 2.

A surface of the glass film of the resultant glass film laminate of Comparative Example 2 was subjected to washing treatment and film-forming treatment. The adhesive force between the supporting glass and the glass film was sometimes insufficient, and hence the supporting glass peeled from the glass film in the treatment in some cases. As a result, positioning and handling were not performed satisfactorily.

INDUSTRIAL APPLICABILITY

The present invention can be suitably used for producing a glass substrate for devices such as flat panel displays including a liquid crystal display and an OLED display and a solar cell, and a cover glass for an OLED lighting device.

REFERENCE SIGNS LIST 1 glass film laminate
2 glass film
3 supporting glass
4 smooth surface
5 rough surface

The invention claimed is:
1. A glass film laminate comprising:
a supporting glass having a thickness of 400 μm or more; and
a glass film peelably laminated to the supporting glass, the glass film having a thickness of 300 μm or less, wherein a contacting surface of the glass film and a contacting surface of the supporting glass directly contact each other and adhere to each other without an adhesive therebetween, wherein the contacting surface of the glass film includes a first region and a second region with a surface roughness smaller than a surface roughness of the first region, the second region having a surface roughness Ra of 2.0 nm or less, and wherein both of the first region and the second region adhere to the contacting surface of the supporting glass.

2. The glass film laminate of claim 1, wherein an adhesive force between the supporting glass and the glass film is greater at the second region than at the first region.

3. The glass film laminate of claim 1, wherein a difference in surface roughness Ra between the first region and the second region is 0.1 nm or more.

4. The glass film laminate of claim 1, wherein the second region is disposed at an outer peripheral portion of the glass film, and the first region is disposed at an inner portion of the glass film surrounded by the outer peripheral portion.

5. The glass film laminate of claim 1, wherein the glass film comprises at least one corner portion, and the second region is disposed at the corner portion.

6. The glass film laminate of claim 1, wherein the first region is disposed at an outer peripheral portion of the glass film, and the second region is disposed at an inner portion of the glass film surrounded by the outer peripheral portion.

7. The glass film laminate of claim 1, wherein the contacting surface of the glass film has a plurality of first regions and a plurality of second regions with a surface roughness smaller than a surface roughness of the first regions, and wherein the first regions and the second regions are arranged alternately in a stripe configuration on the contacting surface of the glass film.

8. The glass film laminate of claim 1, wherein a difference in surface roughness Ra between the first region and the second region is 0.3 nm or more.

9. A glass film laminate comprising:

a supporting glass having a thickness of 400 μm or more; and a glass film peelably laminated to the supporting glass, the glass film having a thickness of 300 μm or less wherein a contacting surface of the glass film and a contacting surface of the supporting glass directly contact each other and adhere to each other without an adhesive therebetween, wherein the contacting surface of the supporting glass includes a first region and a second region with a surface roughness smaller than a surface roughness of the first region, the second region having a surface roughness Ra of 2.0 nm or less, and wherein both of the first region and the second region adhere to the contacting surface of the glass film.

10. The glass film laminate of claim 9, wherein an adhesive force between the supporting glass and the glass film is greater at the second region than at the first region.

11. The glass film laminate of claim 9, wherein a difference in surface roughness Ra between the first region and the second region is 0.1 nm or more.

12. The glass film laminate of claim 9, wherein the second region is disposed at an outer peripheral portion of the supporting glass, and the first region is disposed at an inner portion of the supporting glass surrounded by the outer peripheral portion.

13. The glass film laminate of claim 9, wherein the supporting glass comprises at least one corner portion, and the second region is disposed at the corner portion.

14. The glass film laminate of claim 9, wherein the first region is disposed at an outer peripheral portion of the supporting glass, and the second region is disposed at an inner portion of the supporting glass surrounded by the outer peripheral portion.

15. The glass film laminate of claim 9, wherein the contacting surface of the supporting glass has a plurality of first regions and a plurality of second regions with a surface roughness smaller than a surface roughness of the first regions, and wherein the first regions and the second regions are arranged alternately in a stripe configuration on the contacting surface of the supporting glass.

16. The glass film laminate of claim 9, wherein a difference in surface roughness Ra between the first region and the second region is 0.3 nm or more.

17. The glass film laminate of claim 9, wherein a ratio of the area of the second region to the area of the first region is in a range of 1:200 to 3:1.

18. The glass film laminate of claim 9, wherein a ratio of the area of the second region to the area of the first region is 3:1.

* * * * *